US010042050B2

(12) United States Patent
De Mersseman et al.

(10) Patent No.: US 10,042,050 B2
(45) Date of Patent: Aug. 7, 2018

(54) VEHICLE RADAR SYSTEM WITH BLIND SPOT DETECTION

(71) Applicant: Veoneer US, Inc., Southfield, MI (US)

(72) Inventors: Bernard De Mersseman, Andover, MA (US); Olof Eriksson, Alvsjo (SE); Roine Andersson, Knutby (SE)

(73) Assignee: Veoneer US, Inc., Southfield, MI (US)

( * ) Notice: Subject to any disclaimer, the term of this patent is extended or adjusted under 35 U.S.C. 154(b) by 316 days.

(21) Appl. No.: 14/774,028

(22) PCT Filed: Mar. 12, 2014

(86) PCT No.: PCT/US2014/024507
§ 371 (c)(1),
(2) Date: Sep. 9, 2015

(87) PCT Pub. No.: WO2014/150908
PCT Pub. Date: Sep. 25, 2014

(65) Prior Publication Data
US 2016/0033640 A1 Feb. 4, 2016

Related U.S. Application Data

(60) Provisional application No. 61/798,009, filed on Mar. 15, 2013.

(51) Int. Cl.
*G01S 13/93* (2006.01)
*G01S 7/28* (2006.01)
(52) U.S. Cl.
CPC .......... *G01S 13/931* (2013.01); *G01S 7/2813* (2013.01); *G01S 2013/9332* (2013.01)

(58) Field of Classification Search
CPC ...................................................... G01S 13/931
USPC ............................................................ 342/70
See application file for complete search history.

(56) References Cited

U.S. PATENT DOCUMENTS

| 5,008,678 | A | * | 4/1991 | Herman | .................. G01S 7/032 |
| | | | | | 342/158 |
| 6,025,796 | A | * | 2/2000 | Crosby, II | ............. B60R 21/013 |
| | | | | | 342/70 |
| 6,121,916 | A | * | 9/2000 | McDade | ............... G01S 13/931 |
| | | | | | 342/114 |
| 6,363,326 | B1 | * | 3/2002 | Scully | ..................... G01S 13/48 |
| | | | | | 340/435 |
| 7,365,676 | B2 | * | 4/2008 | Mende | .................. G01S 13/931 |
| | | | | | 342/118 |

(Continued)

FOREIGN PATENT DOCUMENTS

| KR | 101175745 | 8/2012 |
| WO | 2005073753 | 8/2005 |
| WO | 2012089384 | 7/2012 |

*Primary Examiner* — Peter M Bythrow
(74) *Attorney, Agent, or Firm* — Burns & Levinson, LLP; Steven M. Mills

(57) ABSTRACT

A vehicle radar system for monitoring a blind spot of a vehicle includes a radar transmitter mounted on the vehicle and a transmitting antenna coupled to the radar transmitter. The transmitting antenna transmits radiation in a pattern into a region adjacent to the vehicle, the pattern comprising a first radiation lobe and a second radiation lobe. A null region of the pattern between the first lobe and the second lobe is directed into the region approximately perpendicular to a longitudinal axis of the vehicle, the longitudinal axis running between a rear end of the vehicle and a front end of the vehicle and running along a line of travel of the vehicle.

12 Claims, 15 Drawing Sheets

(56) References Cited

U.S. PATENT DOCUMENTS

| | | | | |
|---|---|---|---|---|
| 7,369,941 B2* | 5/2008 | Schiffmann | G01S 13/878 340/435 |
| 7,504,986 B2* | 3/2009 | Brandt | G01S 13/931 340/435 |
| 2005/0248445 A1* | 11/2005 | Matsuoka | B60Q 9/008 340/435 |
| 2006/0077052 A1* | 4/2006 | Matsuoka | G01S 13/56 340/471 |
| 2006/0158369 A1* | 7/2006 | Shinoda | G01S 7/2925 342/70 |
| 2007/0152869 A1* | 7/2007 | Woodington | G01S 13/48 342/70 |
| 2007/0179712 A1* | 8/2007 | Brandt | G01S 13/931 701/300 |
| 2007/0222662 A1* | 9/2007 | Toennesen | G01S 13/48 342/27 |
| 2007/0241962 A1* | 10/2007 | Shinoda | G01S 7/032 342/361 |
| 2007/0279199 A1* | 12/2007 | Danz | B60Q 9/006 340/435 |
| 2008/0030394 A1* | 2/2008 | Yoshida | G01S 13/931 342/74 |
| 2008/0150819 A1* | 6/2008 | Uno | H01Q 3/24 343/770 |
| 2009/0189814 A1* | 7/2009 | Moriuchi | G01S 3/48 342/451 |
| 2009/0322501 A1* | 12/2009 | Haberland | B60Q 9/006 340/435 |
| 2011/0080313 A1* | 4/2011 | Wintermantel | G01S 7/032 342/70 |
| 2011/0137528 A1* | 6/2011 | Le | B60R 21/0134 701/45 |
| 2011/0241857 A1* | 10/2011 | Brandenburger | G01S 15/87 340/435 |
| 2012/0133547 A1* | 5/2012 | MacDonald | G01S 13/931 342/70 |
| 2012/0194377 A1* | 8/2012 | Yukumatsu | G01S 13/931 342/70 |
| 2013/0181860 A1* | 7/2013 | Le | G01S 13/931 342/72 |
| 2013/0321196 A1* | 12/2013 | Binzer | G01S 13/87 342/70 |

* cited by examiner

VEHICLE RADAR SYSTEM WITH BLIND SPOT DETECTION

CROSS-REFERENCE TO RELATED APPLICATIONS

This application is a U.S. national stage application under 35 U.S.C. 371 of co-pending International Application No. PCT/US14/24507, filed on Mar. 12, 2014, and entitled VEHICLE RADAR SYSTEM WITH BLIND SPOT DETECTION, which in turn claims priority to and benefit of U.S. provisional application No. 61/798,009, filed on Mar. 15, 2013, which is incorporated by reference herein in its entirety for all purposes.

BACKGROUND

1. Technical Field

This application is related to vehicle radar systems, and, more particularly, to vehicle radar systems with blind spot detection.

2. Discussion of Related Art

Some automotive radar systems monitor the immediate surroundings of a host vehicle and can enable safety or comfort features such as blind spot detection and lateral collision avoidance. Blind spot detection radar sensors must cover a very wide area and must have the ability to classify the obstacles in the radar field of view. In particular, for example, the radar sensor must be able to distinguish a flat wall or guardrail from a stagnant vehicle at low speed, i.e., a vehicle travelling in the same direction and at approximately the same speed as the host vehicle.

Conventional vehicle blind spot detection/monitoring systems typically implement one broad radar transmit pattern and an array of receivers. The receiver beam is either steered or formed digitally. For example, in some systems, switchable relatively narrow beams scan the area of interest. This approach has the disadvantage of requiring multiple analog receiver circuits, which can be relatively high-cost. In other systems, a single broad transmit antenna is used for short range, and several, e.g., four, separate receivers are used to enable digital beam forming. These approaches to digital beam forming can also add substantially to the cost of the system.

SUMMARY

The present invention is directed to a vehicle radar system with blind spot detection which overcomes these drawbacks of the prior art. The vehicle to which the invention is directed can be any type of moving vehicle, including an automobile, bus, truck, motorcycle, bicycle, etc. The invention is described herein referring to the vehicle as an automobile. However, it will be understood that the invention is applicable to other types of vehicles.

According to the present invention, a fixed transmission (Tx) pattern with specific characteristics is used. The Tx pattern is fixed, i.e., not steerable, and has a null in the direction perpendicular to the direction of travel of the vehicle. According to the invention, such a pattern can be realized by a network feeding two rows of patches with a fixed phase shift, i.e., a fixed phase difference between rows, which can be, for example, 120 degrees. If the radar transceiver, which is also interchangeably referred to herein as a "radar sensor" or simply "sensor," is mounted at +20 degrees directed toward the rear of the vehicle, then the null in the Tx pattern is formed at −20 degrees relative to the sensor bore sight, such that the null is created perpendicular to the direction of travel of the vehicle.

As a result of this feature of the Tx pattern, the return from a stationary object, e.g., wall or guardrail, having zero range rate, i.e., no Doppler, is minimized, while the return from the guardrail in the forward and rearward directions has a measurable Doppler shift. This facilitates classification of the guardrail. Another road vehicle stagnating in the blind spot detection zone provides a return from the side lobe and the main backward beam with no Doppler shift as the vehicle is stagnating, i.e., has no range rate.

According to one aspect, a vehicle radar system for monitoring a blind spot of a vehicle is provided. The vehicle has a longitudinal axis running between a rear end of the vehicle and a front end of the vehicle and runs along a line of travel of the vehicle. The vehicle radar system includes a radar transmitter mounted on the vehicle and a transmitting antenna array coupled to the radar transmitter. The radar transmitter and transmitting antenna array transmit radiation in a pattern into a region adjacent to the vehicle. The pattern includes a first radiation lobe and a second radiation lobe. A null region of the pattern between the first lobe and the second lobe is directed into the region approximately perpendicular to the longitudinal axis of the vehicle.

In some exemplary embodiments, a bore sight of the antenna is directed away from the vehicle at an angle of approximately 20 degrees from the null region toward the rear end of the vehicle.

In some exemplary embodiments, the transmitting antenna array comprises at least one planar antenna cell.

In some exemplary embodiments, the transmitting antenna array comprises a first antenna cell and a second antenna cell for transmitting the radiation into the region. A phase shifter between the first and second antenna cells adjusts phase of at least one of the first and second antenna cells to steer the radiation.

In some exemplary embodiments, the phase shifter introduces approximately 120 degrees of phase difference between the first and second antenna cells.

In some exemplary embodiments, the system further comprises at least one receiving antenna array for receiving radiation return signals from objects in the region adjacent to the vehicle.

In some exemplary embodiments, the at least one receiving antenna array comprises first and second receiving antennas.

In some exemplary embodiments, the at least one receiving antenna array comprises at least one planar antenna cell.

In some exemplary embodiments, the system further comprises a processor for processing the radiation return signals to determine at least one of speed and range of the objects in the region adjacent to the vehicle.

In some exemplary embodiments, the region adjacent to the vehicle in which the objects are detected includes a blind spot of the vehicle.

In some exemplary embodiments, the radar system is a pulsed Doppler radar system.

In some exemplary embodiments, the radar system operates at a radar frequency of 24 GHz.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the inventive concept.

FIG. 9 also includes mathematical equations used in calculating the bearing angle, according to some exemplary embodiments.

DETAILED DESCRIPTION

Figure 1:
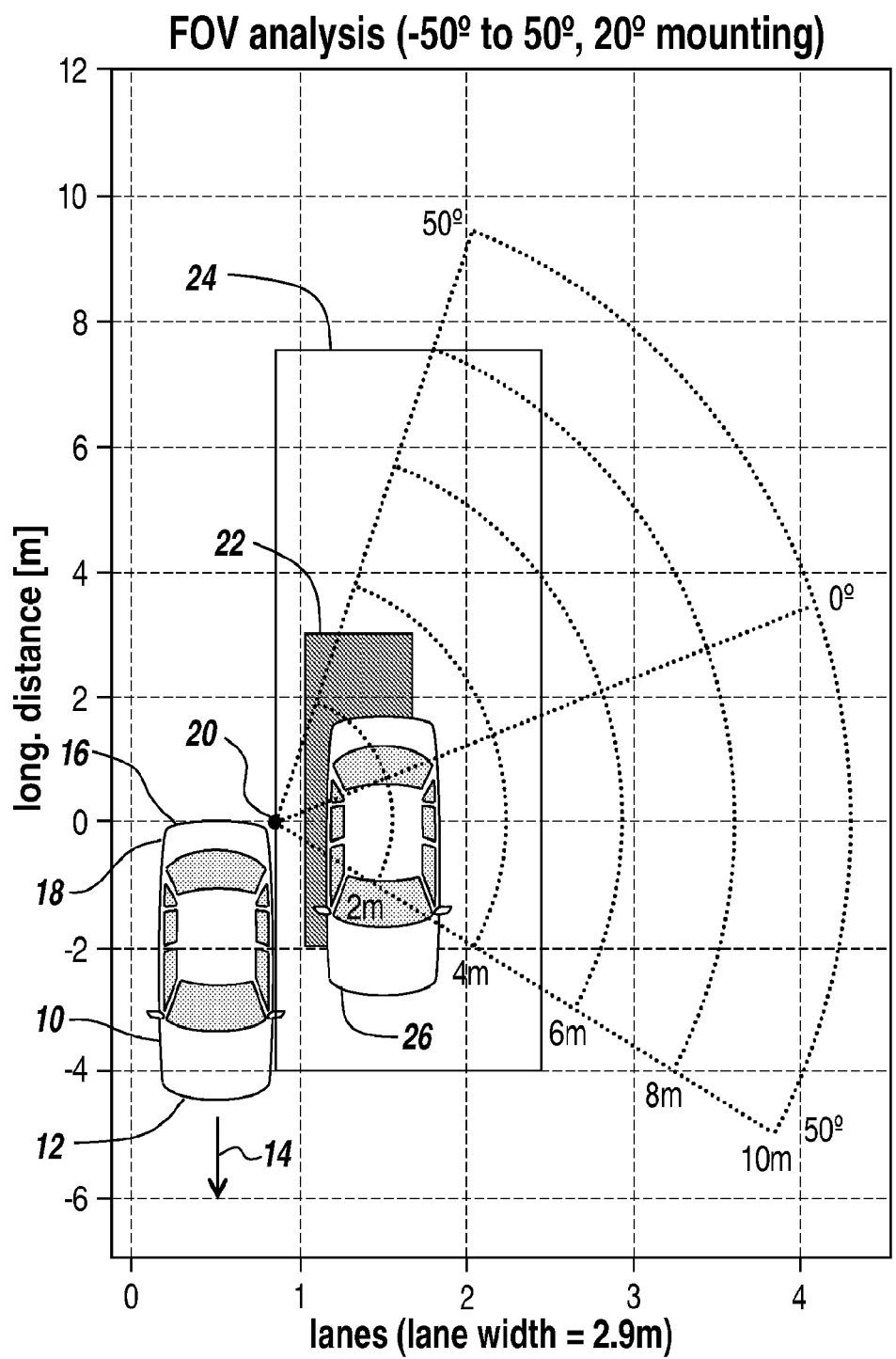
FIG. 1 includes a schematic diagram which illustrates a vehicle equipped with a radar system for blind spot detection/monitoring, according to some exemplary embodiments.

FIG. 1 includes a schematic diagram which illustrates a vehicle 10 equipped with a radar system for blind spot detection/monitoring, according to some exemplary embodiments. In FIG. 1, vehicle 10 is illustrated such that the front end 12 of vehicle 10 is facing in the direction indicated by directional arrow 14, which indicates the direction of travel of vehicle 10. The rear end 18 of vehicle 10 includes a rear bumper 16 to which the radar transceiver 20 according to exemplary embodiments is attached. It should be noted that radar transceiver 20 is also interchangeably referred to herein as a "radar sensor" or simply as a "sensor." In some particular embodiments, in accordance with Blind Spot Information System (BSIS) and Rear Cross Traffic Alert system requirements, radar sensor 20 provides a minimum total 100-degree field of view, including a minimum +50 degree field of view to provide timely detection of a vehicle approaching from the rear and a minimum −50 degree field of view for detection of an approaching vehicle from the front. A region adjacent to vehicle 10 includes a must-alert zone 22 and a may-alert zone 24. The radar system is required to provide an alert when any portion of another vehicle 26 occupies any portion of must-alert zone 22, which may also be referred to as the "blind spot" of vehicle 10. The radar system is permitted to and may provide an alert when another vehicle 26 occupies any portion of may-alert zone 24.

Figure 2:
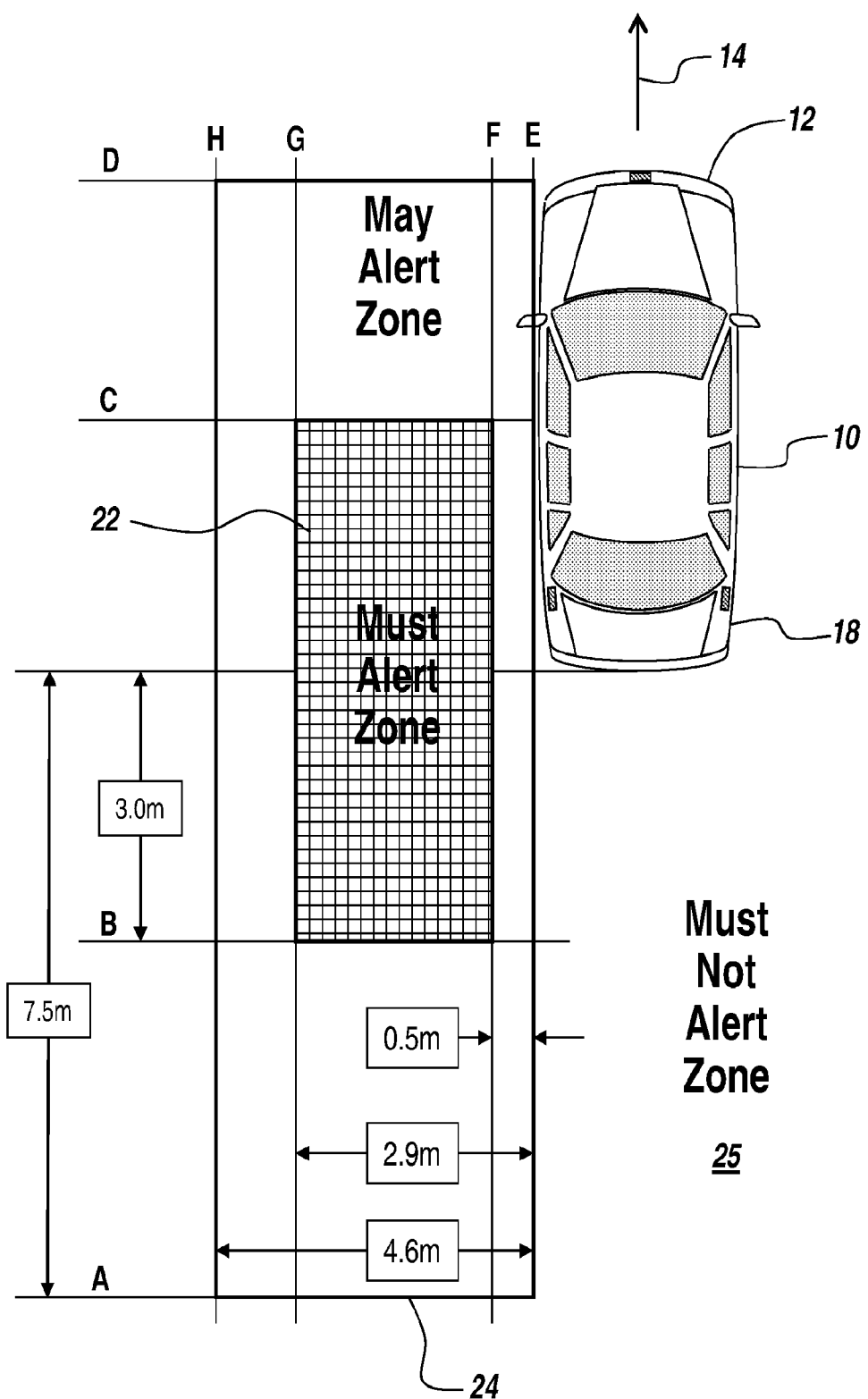
FIG. 2 includes a detailed schematic diagram of the vehicle and the region adjacent to the vehicle, according to some exemplary embodiments.

FIG. 2 includes a detailed schematic diagram of vehicle 10 and the region adjacent to vehicle 10, according to some exemplary embodiments. As described above, vehicle 10 includes front end 12 and rear end 18, which define a direction of forward travel indicated by arrow 14. In some exemplary embodiments, must-alert zone 22, i.e., blind spot of vehicle 10, is defined to extend vertically from reference B to reference C and horizontally from reference G to reference F. As noted above, if any portion of another vehicle enters any portion of must-alert zone 22, an alert will be generated. May-alert zone 24 extends outside of must-alert zone 22 vertically from reference A to reference D and horizontally from reference H to reference E. No alerts are issued if another vehicle is located completely outside of may-alert zone 24, i.e., in must-not-alert zoned 25.

It should be noted that FIG. 2 includes specific exemplary dimensions related to must-alert zone 22, may-alert zone 24 and vehicle 10. It will be understood that these dimensions are exemplary only and that the various zones and vehicle 10 can have other dimensions.

Figure 3A:
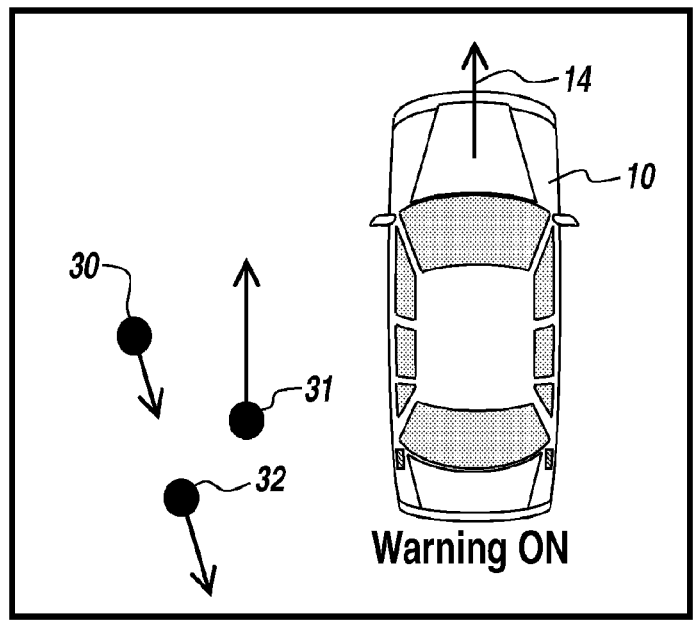
FIGS. 3A and 3B include schematic diagrams illustrating the vehicle and the region adjacent to the vehicle, which is monitored by blind spot detection radar, according to some exemplary embodiments.
Figure 3B:
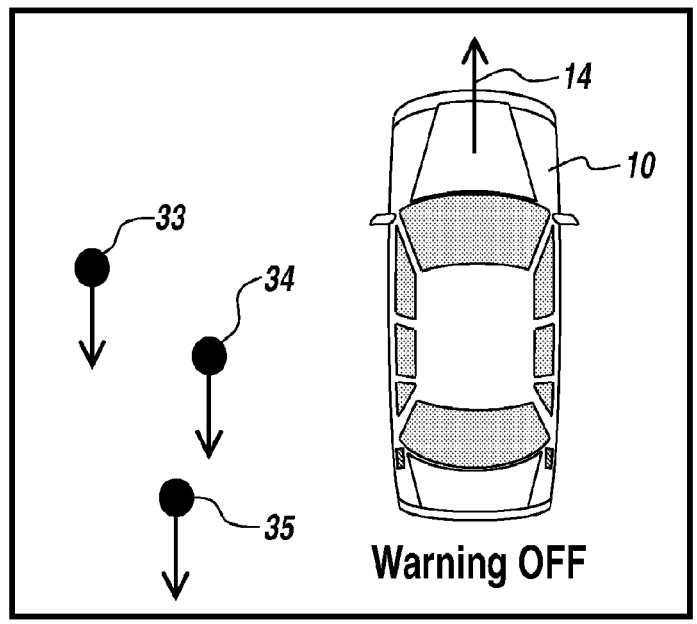

According to the inventive concept, the radar system monitors the region immediately adjacent to vehicle 10 in order to provide alerts when other vehicles enter the blind spot of vehicle 10. FIGS. 3A and 3B include schematic diagrams illustrating vehicle 10 and the region adjacent to vehicle 10, which is monitored by blind spot detection radar, according to some exemplary embodiments. Vehicle 10 is illustrated to be moving in a forward direction at a velocity, i.e., direction and speed, indicated by vector 14. FIGS. 3A and 3B also include schematic representations of potential objects 30, 31, 32, 33, 34, 35, which may be stationary with respect to vehicle 10 or may be moving laterally or in parallel, i.e., forward or backward, with respect to vehicle 10, as indicated schematically by a velocity vector at each object. FIG. 3A illustrates examples of detected object which will cause alerts to be generated, and FIG. 3B illustrates example of detected objects which will not cause alerts to be generated.

Referring to FIG. 3A, objects 30 and 32 are moving primarily backward, but also have a lateral motion component directed toward vehicle 10. These could be other merging vehicles entering the blind spot of vehicle 10 from the front and side of vehicle 10, and, therefore, will cause alerts to be generated. Object 31 is located in the blind spot of vehicle 10 and is moving in the same direction as vehicle 10. It is moving at approximately the same speed as, i.e., stagnating with, or slightly faster than, i.e., overtaking, vehicle 10. Object 31 will also cause an alert to be generated.

Referring to FIG. 3B, detected objects 33, 34 and 35 are detected as moving backwards with respect to vehicle 10, and in a direction parallel to vehicle 10, at approximately the same speed as the speed at which vehicle 10 is moving. These objects 33, 34 and 35 are concluded to be stationary with respect to the roadway, and may be stationary objects such as guardrails, walls, or the like. Such objects do not cause alerts to be generated.

Figure 4:
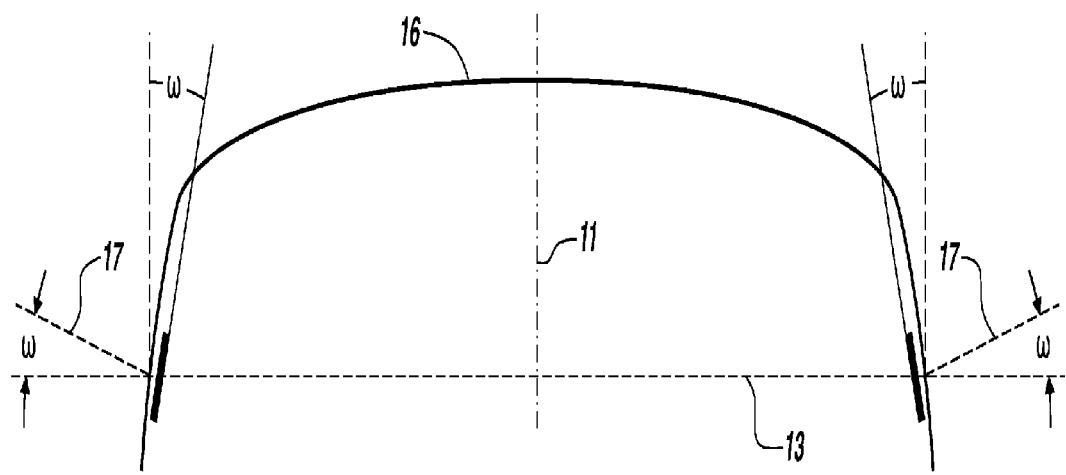
FIG. 4 includes a schematic diagram of a rear bumper of the vehicle with radar transceivers mounted thereon, according to some exemplary embodiments.

FIG. 4 includes a schematic diagram of rear bumper 16 of vehicle 10, according to some exemplary embodiments. Referring to FIG. 4, radar transceivers or sensors 20 are attached to the inside of rear bumper 16. In some exemplary embodiments, two radar sensors 20 are attached to respective left and right sides of bumper 16. In some embodiments, radar sensors 20 are oriented to be pointed an angle ω from the longitudinal axis 11. In some particular exemplary embodiments, the angle ω is approximately 20 degrees. Other angles can be selected; ω=20 degrees will be used in this description as an exemplary illustration. With the orientation angle co, the bore sights 17 of radar sensors 20 are oriented the angle ω toward the rear of vehicle 10 from the side-to-side axis 13 that is perpendicular to longitudinal axis 11.

Figure 5:
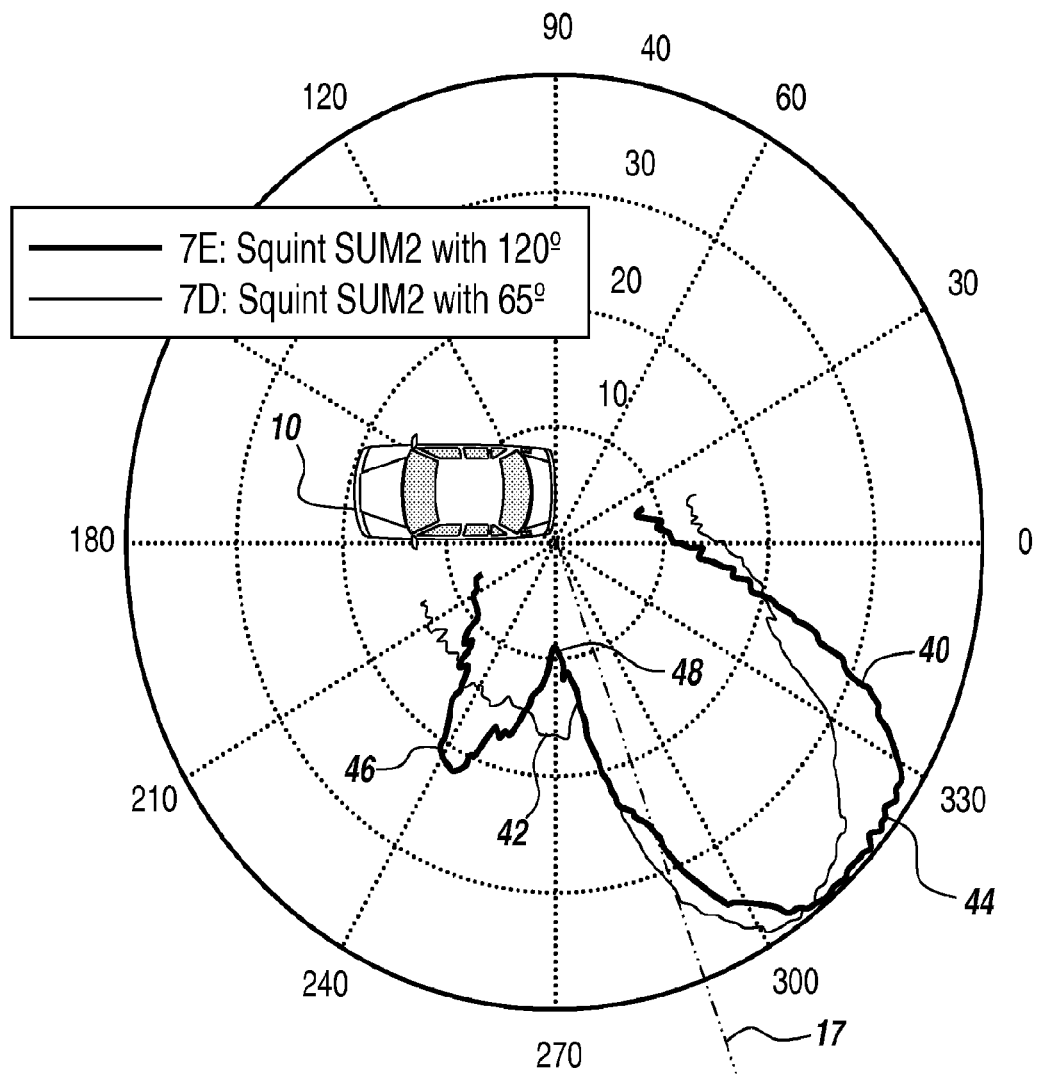
FIG. 5 includes a schematic diagram illustrating exemplary radar transmit patterns used to monitor the blind spot of the vehicle, according to some exemplary embodiments.

FIG. 5 includes a schematic diagram illustrating radar transmit patterns used to monitor the blind spot of vehicle 10, according to some exemplary embodiments. Referring to FIG. 5, two transmit pattern curves 40 and 42 are illustrated. According to the inventive concept, the transmit pattern can be achieved by using an array of two transmit antenna cells. A phase shifter is used to adjust the phase of each cell to steer the beam into the antenna bore sight or squint. FIG. 5 includes a first transmit pattern 40 in a bold line and a second transmit pattern 42 in a fine line. The pattern 40 in the bold line is generated by introducing approximately 120 degrees of phase difference between the two antenna cell feeds. The pattern 42 in the fine line is generated by introducing approximately 65 degrees of phase difference between the two antenna cell feeds. The amount of phase difference and, hence, the shape of the transmit pattern used, can be selected based upon the desired performance characteristics and features of the application in which the system is to be used.

Referring to FIG. 5, and referring specifically to the transmit pattern 40 in the bold line as an exemplary illustration, transmit pattern 40 includes a first main lobe 44 and a second front side lobe 46. First main lobe 44 provides high gain in the backward direction for detection of vehicles entering the blind spot from the rear. Ground stationary target returns, i.e., returns from ground stationary targets such as guardrails, walls, etc., include a Doppler shift, since such ground stationary targets are in motion relative to vehicle 10. Second front side lobe 46 enables detection of a front-entry stagnant or merging vehicle.

Pattern 40 also includes a null 48 between lobe 44 and lobe 46. Null 48 in the direction perpendicular to longitudinal axis 11 of vehicle 10 (FIG. 4) enables target classification. Specifically, null 48 allows for the discrimination between ground stationary objects, e.g., guardrails, and other vehicles traveling in the blind spot zone. With null 48 perpendicular to the direction of travel, the return from a ground stationary object having zero range rate, i.e., no Doppler, is minimized. The return from the ground stationary object in the forward and backward directions has a measurable Doppler shift, which facilitates classification of the ground stationary object. On the other hand, a vehicle stagnating in the blind spot zone provides a return from second front side lobe 46 and the first main lobe 44 with no Doppler shift, i.e., no range rate.

Continuing to refer to FIG. 5, the axis between 0 and 180 degrees is parallel to longitudinal axis 11 of vehicle 10. The axis between 90 and 270 degrees is parallel to side-to-side axis 13. Bore sight 17 of radar sensor 20 is directed +20 degrees rearward from side-to-side axis 13. Thus, null 48 in pattern 40 is generated at −20 forward of bore sight 17, which places null 48 on side-to-side axis 13, projecting perpendicular to longitudinal axis 11 of vehicle 10.

Figure 6:
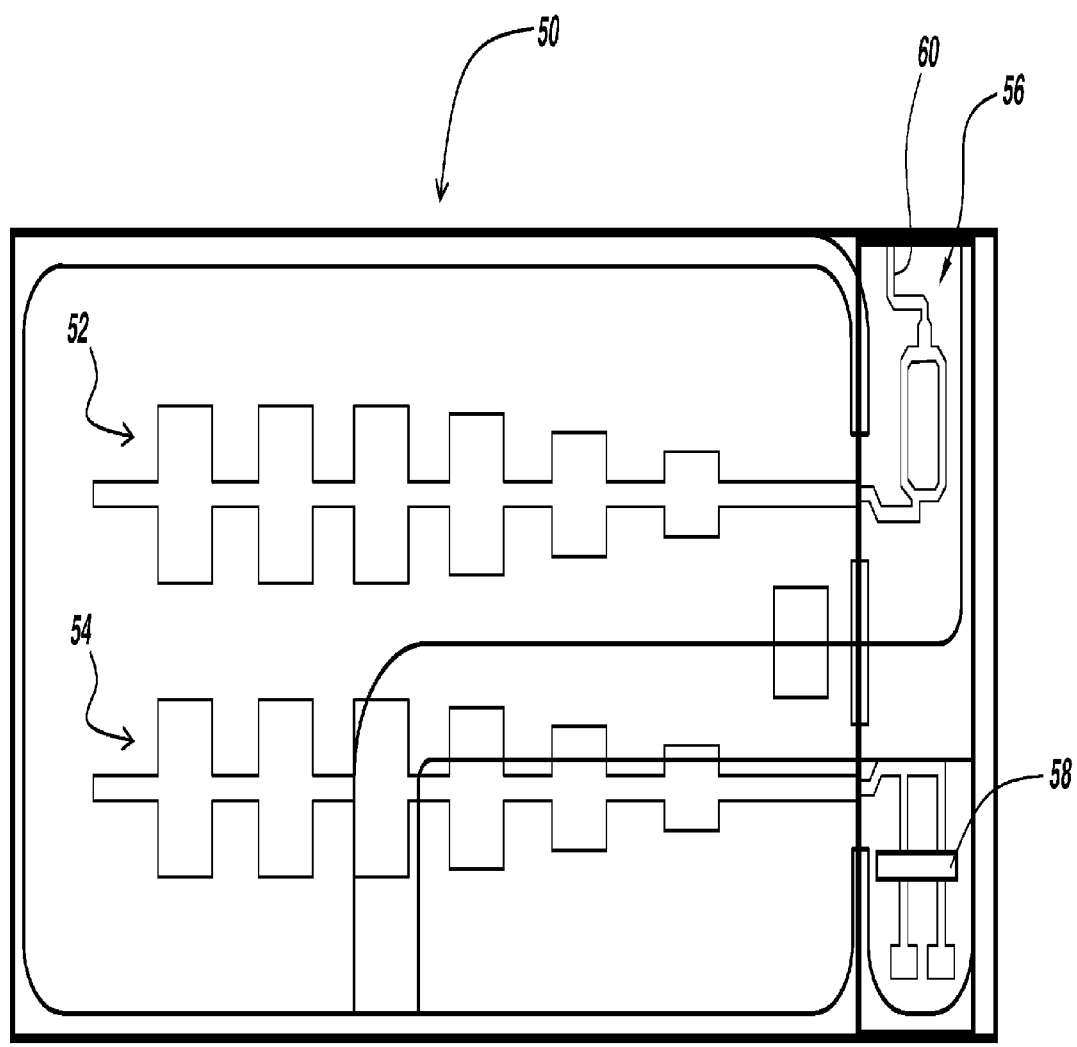
FIG. 6 includes a schematic plan view diagram of transmit antenna circuitry used to generate the radar transmit pattern for blind spot detection/monitoring, according to some exemplary embodiments.

FIG. 6 includes a schematic plan view diagram of transmit antenna circuitry 50 used to generate the radar transmit pattern for blind spot detection/monitoring, according to some exemplary embodiments. Referring to FIG. 6, transmit antenna circuitry 50 includes two antenna cells 52 and 54 used to transmit radar signals into the region adjacent to vehicle 10. A phase shifter circuit 56 adjusts the phase of the feed 60 of each antenna cell 52, 54 to steer the beam into the antenna bore sight or squint. In some exemplary embodiments, phase shifter circuit 56 includes diodes 58.

In some exemplary embodiments, phase shifter circuit 56 introduces a predetermined amount of phase difference between the two antenna cells 52 and 54, depending on the desired shape of the transmit pattern. In some particular exemplary embodiments, phase shifter circuit 56 generates a phase difference between antenna cells 52 and 54 of approximately 120 degrees, which results in transmit pattern 40 illustrated in FIG. 5. In other particular exemplary embodiments, phase shifter circuit 56 generates phase difference between antenna cells 52 and 54 of approximately 65 degrees, which results in transmit pattern 42 in FIG. 5. Other phase differences for generating other transmit patterns are possible, within the scope of the present inventive concept.

Figure 7:
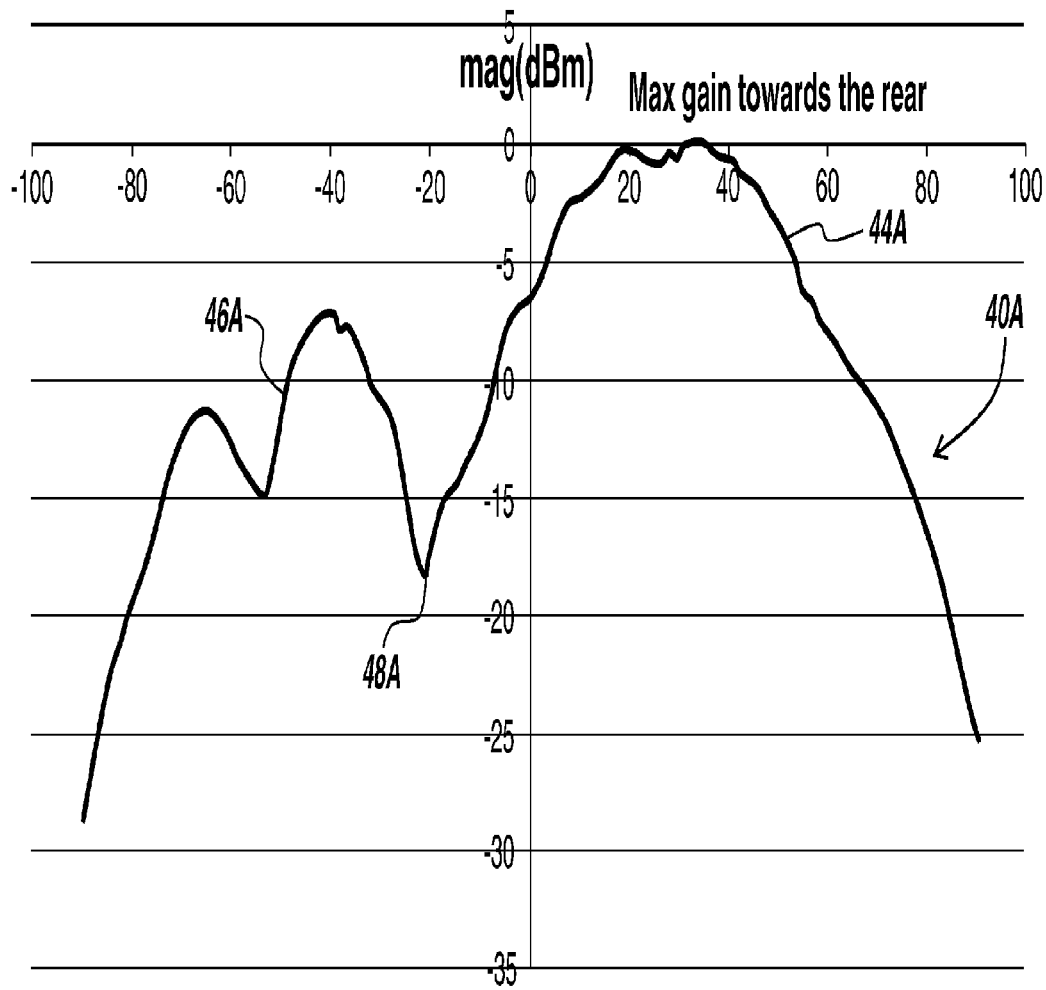
FIG. 7 includes a detailed schematic diagram of a measured antenna transmission pattern generated in accordance with some exemplary embodiments.

FIG. 7 includes a detailed schematic diagram of a measured antenna transmission pattern 40A generated in accordance with some exemplary embodiments. Referring to FIG. 7, the horizontal axis refers to the angle of transmission from the antenna, with 0 degrees being located at bore sight 17 of the antenna. The vertical axis is signal strength, in dBm. As illustrated in the curve of FIG. 7, transmission pattern 40A includes a first main lobe 44A and a second front side lobe 46A. First main lobe 44A provides the maximum gain in the direction toward the rear. Pattern 40A also includes a null 48A between lobe 44A and lobe 46A. Null 48A is located at approximately −20 degrees from bore sight 17 toward the front. With bore sight 17 directed +20 degrees toward the rear, null 48A is directed perpendicular to longitudinal axis 11 of vehicle 10.

Figure 8:
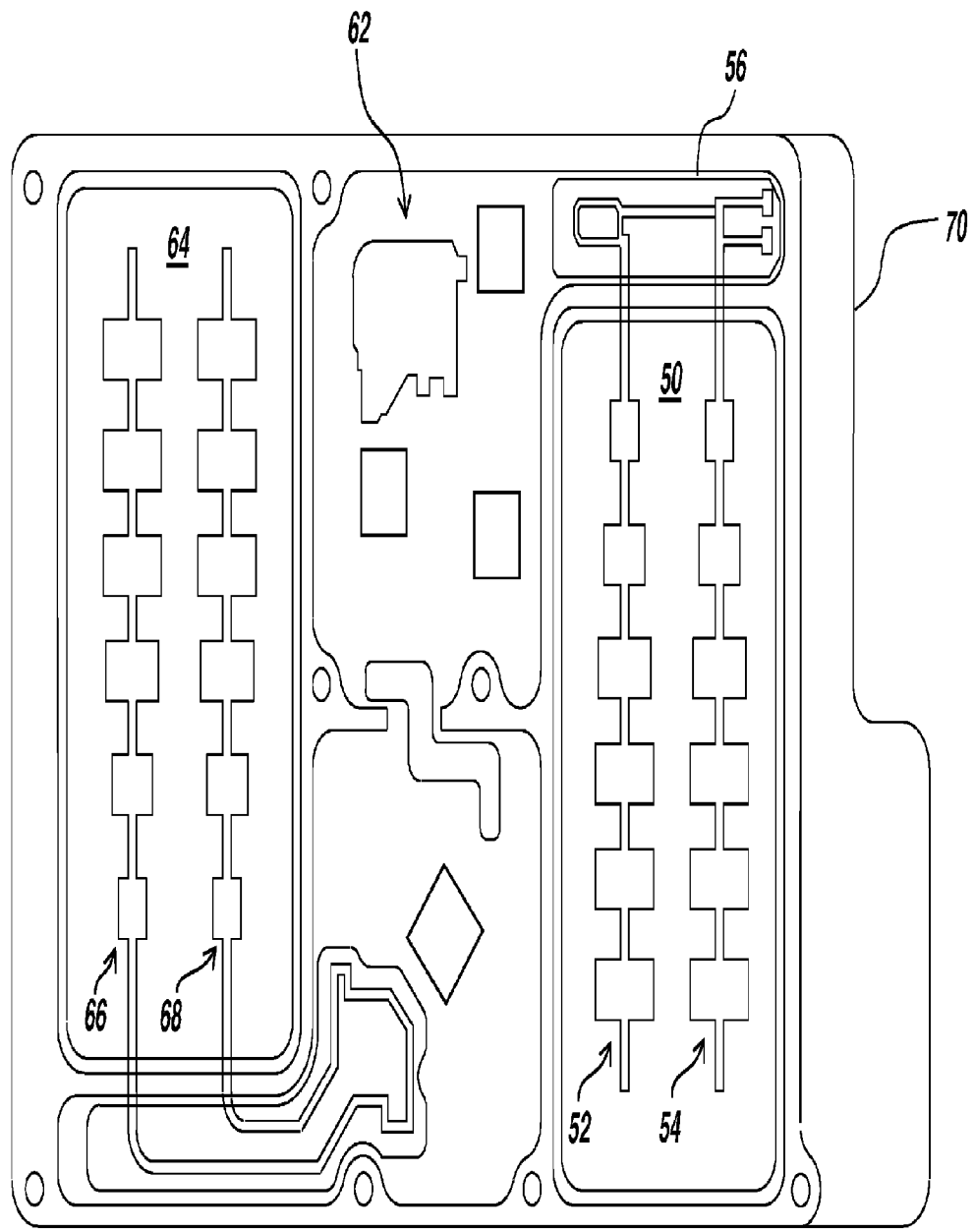
FIG. 8 includes an image of a printed circuit board (PCB), which is part of a radar transceiver, according to some exemplary embodiments.

FIG. 8 includes an image of a printed circuit board (PCB) 70, which is part of the radar transceiver 20, according to some exemplary embodiments. Referring to FIG. 8, PCB 70 includes a receiver section, which includes receive antenna circuitry 64 and a transmitter section, which includes transmit antenna circuitry 50. As described above, transmit antenna circuitry 50 includes two antenna cells 52 and 54 used to transmit radar signals into the region adjacent to vehicle 10. Phase shifter circuit 56 adjusts the phase of the feed of each antenna cell 52, 54 to steer the beam into the antenna bore sight or squint, as described above in detail. Receive antenna circuitry 64 can include two wide-pattern antenna rows 66 and 68. In some exemplary embodiments, antenna rows 66 and 68 are separated by one-half wavelength in order to enable bearing measurement by phase-comparison/phase monopulse techniques. PCB 70 also includes the electronic circuitry 62 used to carry out the required processing and other functions to provide radar signal transmission, reception and processing used to implement the various features of the various embodiments as described herein in detail.

Figure 9:
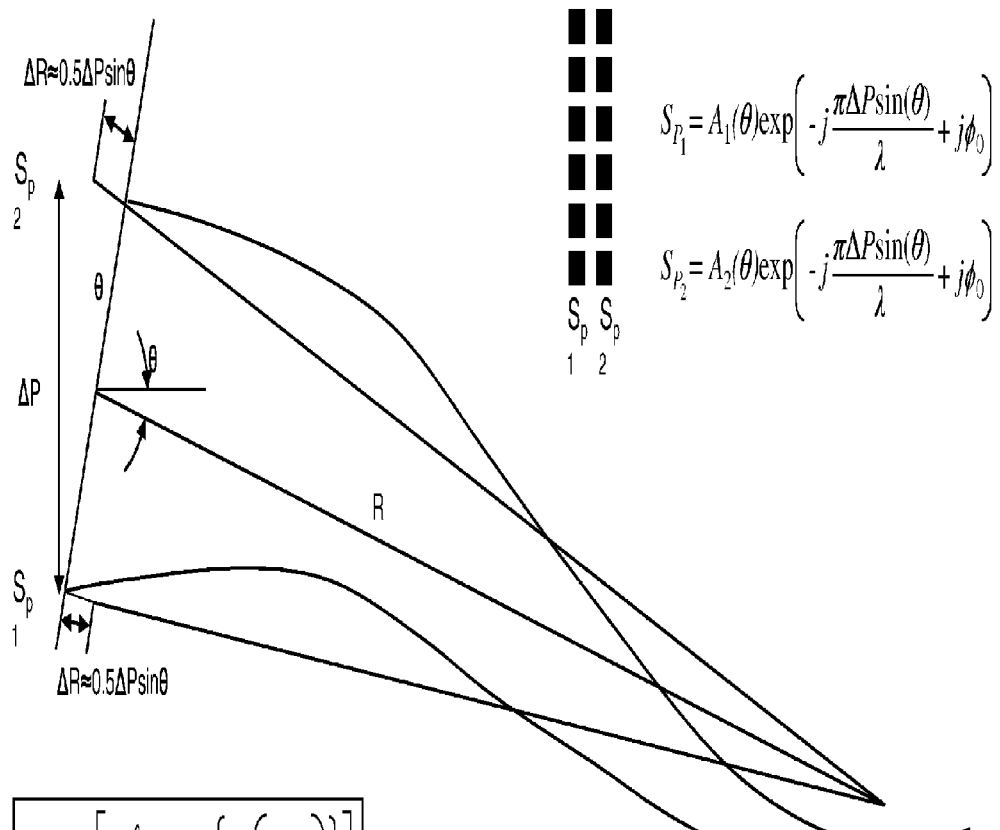
FIG. 9 includes a schematic diagram illustrating an approach to applying a phase comparison technique to the signals received by two receive antennas to determine bearing angle to a target, according to some exemplary embodiments.

FIG. 9 includes a schematic diagram illustrating an approach to applying a phase comparison technique to the signals received by two receive antenna rows 66 and 68 to determine bearing angle θ to a target, according to some exemplary embodiments. FIG. 9 also includes mathematical equations used in calculating the bearing angle θ, according to some exemplary embodiments.

Figure 10:
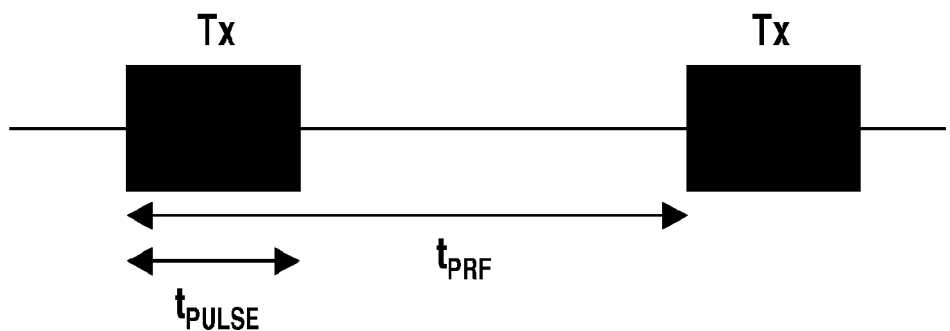
FIG. 10 includes a schematic diagram of the timing of the transmit pulse waveform, according to some exemplary embodiments.

According to some embodiments, the radar detection system uses a 24 GHz narrow-band pulsed radar waveform. FIG. 10 includes a schematic diagram of the timing of the transmit pulse waveform, according to some exemplary embodiments. Referring to FIG. 10, the waveform is a pulsed waveform with a long, i.e., greater than 100 ns, rectangular transmit pulse. In the particular exemplary illustration of FIG. 10, the time duration $t_{PULSE}$ of the rectangular transmit pulse is approximately 150 ns. According to exemplary embodiments, the pulse repetition frequency (PRF) is greater than 1.0 MHz. Hence, the pulse repetition period $t_{PRF}$ is less than 1.0 μs, since only detection at near range is relevant to the blind spot radar detection system. In the particular exemplary illustration of FIG. 10, $t_{PRF}$=500 ns.

Figure 11:
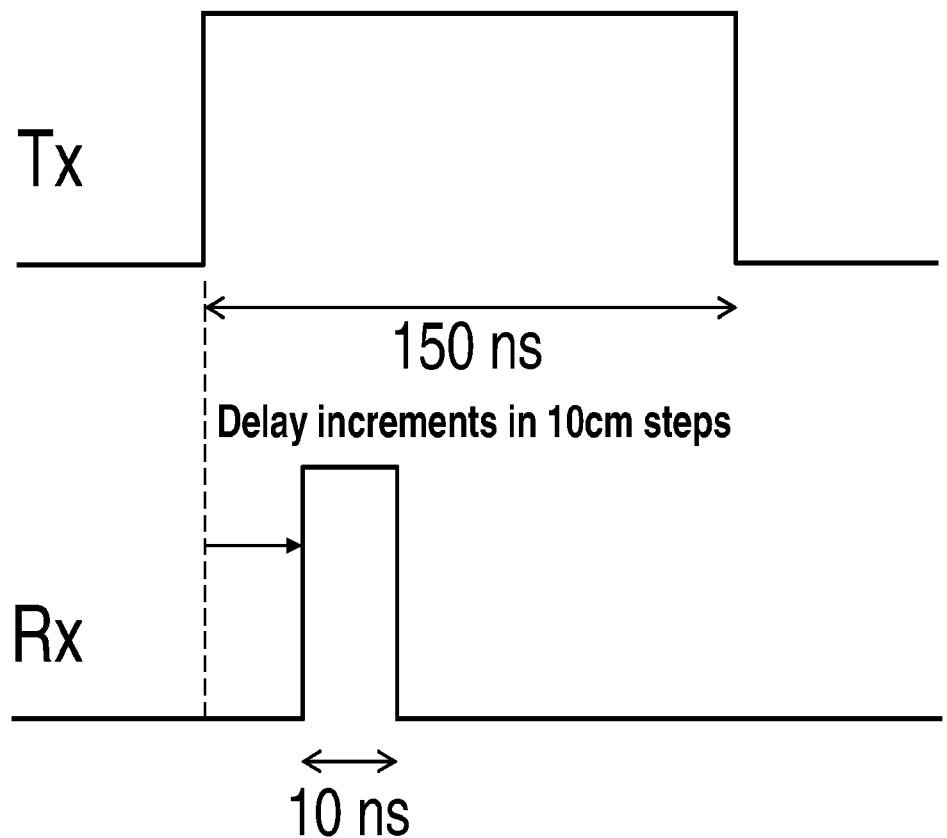
FIG. 11 includes a schematic timing diagram which illustrates the timing of the transmit pulse waveform and the receiver gate pulse waveform, according to some exemplary embodiments.

According to some exemplary embodiments, the receiver gate is set to be very narrow, i.e., less than 10 ns. FIG. 11 includes a schematic timing diagram which illustrates the timing of the transmit pulse waveform and the receiver gate pulse waveform, according to some exemplary embodiments. Referring to FIG. 11, again, the transmit pulse width is illustrated to be approximately 150 ns. The receiver gate pulse is illustrated to be 10 ns wide. Thus the receiver gate is set to be very narrow and the range step/bin increment is a fraction of the receiver gate size. This arrangement causes a significant mismatch and a loss of sensitivity in favor of an accurate localization of targets. For example, in some exemplary embodiments, the receiver gate is activated after a delay which allows for range detection increments in 10 cm steps. Also, very near range detection is realized. In some particular exemplary embodiments, a range limit of 0.2 m was achieved.

Figure 12:
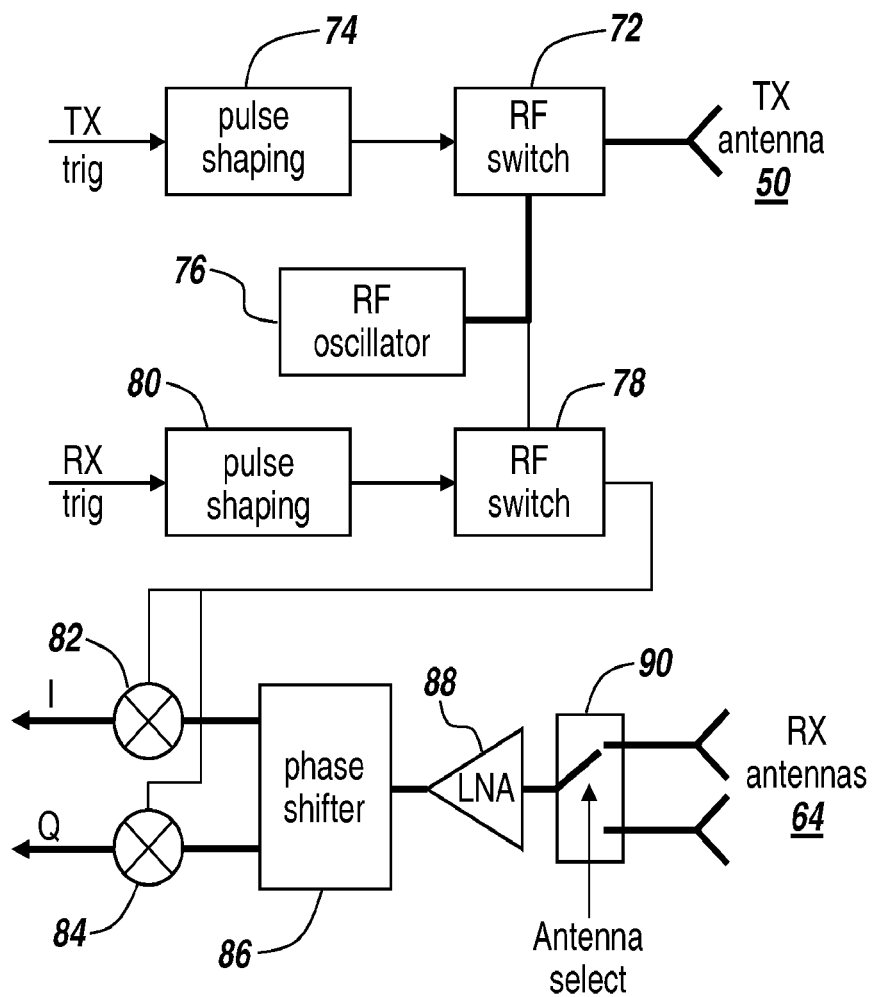
FIG. 12 includes a schematic block diagram of transmit and receive circuitry in a radar transceiver or sensor, according to some exemplary embodiments.

FIG. 12 includes a schematic block diagram of transmit and receive circuitry in a radar transceiver or sensor, such as transceiver or sensor 20 described above, according to some exemplary embodiments. Referring to FIG. 12, a transmit trigger signal Tx Trig is received by pulse shaping circuitry 74 to generate the transmit timing pulse having the timing described above in detail. An RF oscillator 76 generates the RF signal, e.g., the 24 GHz radar signal, to be transmitted into the region adjacent to vehicle 10. The transmit timing pulse generated by pulse shaping circuitry 74 is used to gate the RF signal to transmit antenna 50 by enabling RF switch to selectively pass the pulsed radar signal with the timing of the transmit timing pulse. Transmit antenna 50 transmits the pulsed radar signal into the region adjacent to vehicle 10, including the blind spot.

Continuing to refer to FIG. 12, receive antennas 64 receive radar signals returning from objects illuminated by the transmitted radar signals. An antenna select circuit is used to selectively enable the return radar signals from the antennas such that the return signal from only one of the receive antennas at a time is processed. The selected received signal is amplified by low-noise amplifier (LNA) 88. The received radar signals are phase shifted as required by phase shifter 88 and are routed to I and Q mixers 82 and 84. A receive trigger signal Rx Trig is received by pulse shaping circuitry 80 to generate a receive enabling pulse signal, which is applied to RF switch 78. The RF signal generated by RF oscillator 76 is gated to the I and Q mixers 82 and 84 through RF switch 78, which is selectively enabled to pass the pulsed RF signal by the pulse signal generated by pulse shaping circuitry 80. This pulsed RF signal mixes with the received amplified and phase-shifted radar signals to generate I and Q IF signals for the returning received radar signals for further processing.

Figure 13A:
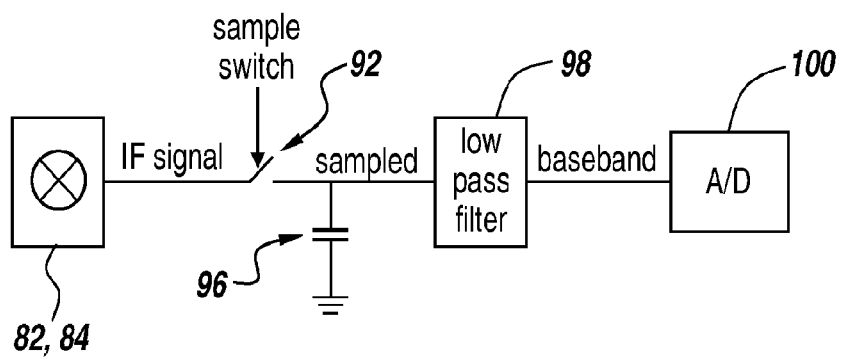
FIG. 13A includes a schematic block diagram illustrating the sample-and-hold processing of one of the I and Q IF signals, according to some exemplary embodiments.
Figure 13B:
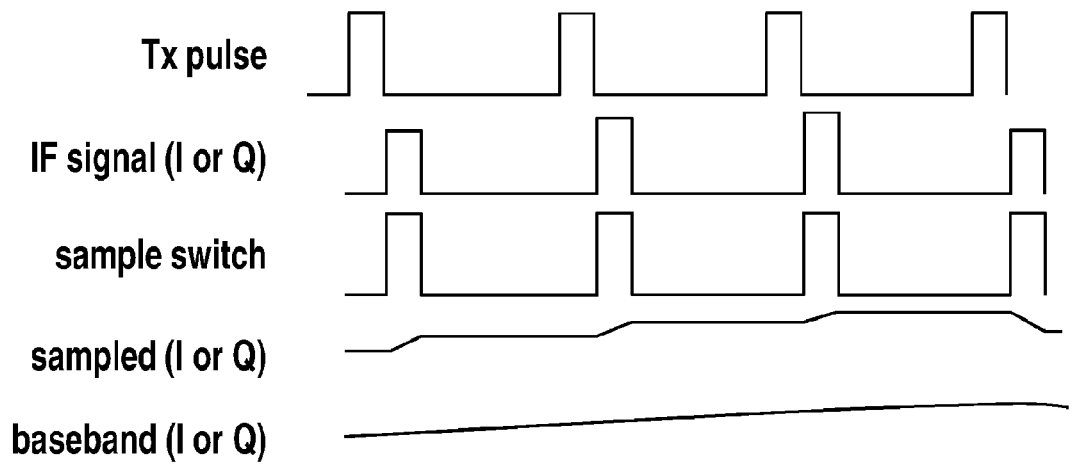
FIG. 13B includes a timing diagram illustrating the timing of the sample-and-hold processing of one of the I and Q IF signals, according to some exemplary embodiments.

FIG. 13A includes a schematic block diagram illustrating the sample-and-hold processing of one of the I and Q IF signals, according to some exemplary embodiments. FIG. 13B includes a timing diagram illustrating the timing of the sample-and-hold processing of one of the I and Q IF signals, according to some exemplary embodiments. Referring to FIGS. 13A and 13B, the I or Q IF signal is received from I or Q mixer 82 or 84, respectively, at a sample switch 92. The closing of sample switch 92 and, therefore, the sampling of the I or Q IF signal, is controlled according to the timing of the sample switch pulse waveform indicated in the timing diagram of FIG. 13B. The sample switch is closed at a time which corresponds to a certain range, according to time of flight (TOF). If there is a target-reflected signal at this time, then it will be sampled. An exemplary illustrative sampled I or Q waveform illustrated in the timing diagram is filtered or "held" using capacitor 96, and the sampled and held I or Q IF signal is filtered to a baseband I or Q signal by low-pass filter 98. An exemplary illustrative baseband I or Q signal is illustrated in the timing diagram of FIG. 13B. The sampled-and-held baseband I or Q signal is routed to analog-to-digital converter (A/D) 100, where it is converted to digital data for further processing.

Figure 14:
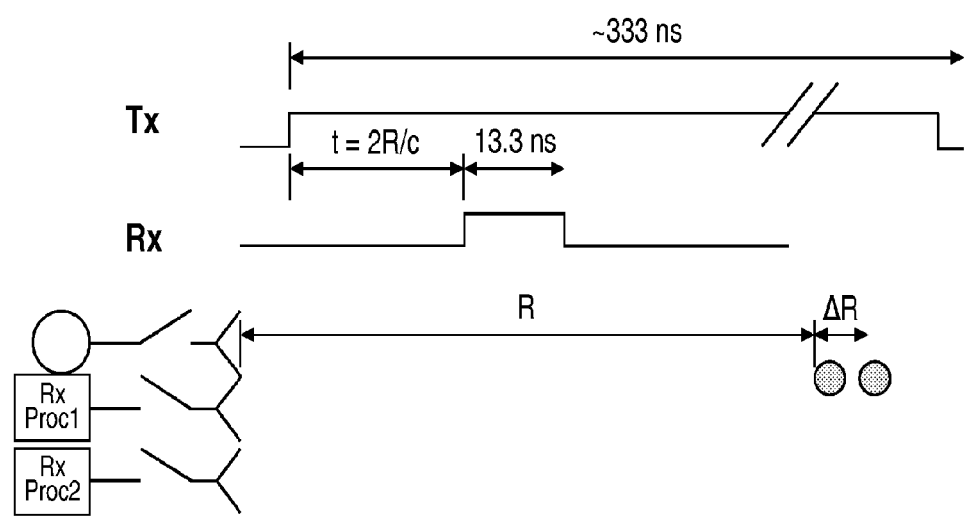
FIG. 14 includes a schematic block diagram and timing diagram of RF, i.e., radar, pulses in flight, according to some exemplary embodiments.

FIG. 14 includes a schematic block diagram and timing diagram of RF, i.e., radar, pulses in flight, according to some exemplary embodiments. Referring to FIG. 14, the transmit pulse is illustrated to extend approximately 333 ns in time. For a single point target at range R, a signal is available to the receiver processor at time t=2R/c, after the rising edge of the transmit pulse, where c is the speed of light. If there is another target at R+ΔR, the signal energy due to the second target may also be admitted to the receiver processor if ΔR<c*X PulseWidth/2=2 m, in this illustrative exemplary embodiment in which the receive gate is 13.3 ns in duration.

Figure 15:
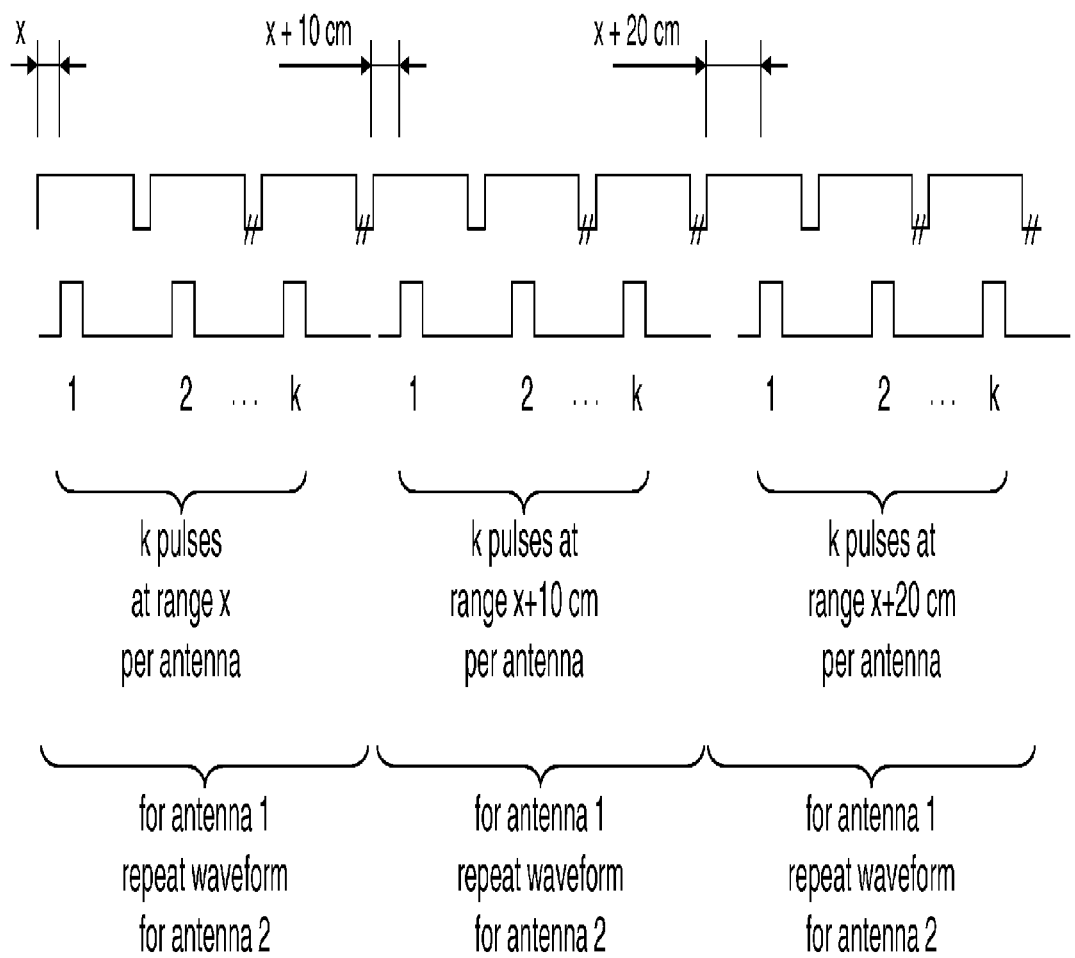
FIG. 15 includes a schematic timing diagram which illustrates the relative timing between transmit pulses and receiver gate pulses, used to detect targets in the blind spot of the vehicle, according to some exemplary embodiments.

FIG. 15 includes a schematic timing diagram which illustrates the relative timing between transmit pulses and receiver gate pulses, used to detect targets in the blind spot of vehicle 10, according to some exemplary embodiments. Referring to FIG. 15, the top timing curve is the transmit pulse curve. It illustrates the timing of a series of radar pulses transmitted into the region adjacent to vehicle 10. The second timing curve represents the receive gate pulse waveform for one of the receive antennas. It will be understood that the same waveform is used with both receive antennas. As illustrated in FIG. 15, for a first series of k transmit pulses and receiver gate pulses, the rising edge of the receiver gate pulse is timed to occur a predetermined time X after the rising edge of the transmit pulse, i.e., after the pulsed radar signal is transmitted into the region adjacent to vehicle 10. The value of the delay X is determined by the range currently being analysed. That is, the receiver gate is open, i.e., active, for the time period during which returns from objects at the desired range would arrive back at radar transceiver 20. For each range, k pulses are transmitted. After the kth pulse, the next pulse, i.e., the first receive gate pulse of the next range being analysed, is generated at a delay of X+ΔX after the rising edge of the transmit pulse. The additional delay ΔX is determined based on the range resolution or sensitivity of the system. In the illustrated exemplary embodiments, the selected ΔX is based on a range resolution of approximately 10 cm. It will be understood that other range resolutions are possible. The next series of k pulses can be initiated at a time of X+2ΔX following the rising edge of the associated transmit pulse. This pattern continues for both receive antennas and for the entire region being scanned by the system.

In some conventional blind spot monitoring and detection systems, a frequency-modulated waveform is employed. These waveforms suffer from feed-through/coupling between receiver and transmitter circuits, which limits very-near-range detection capability. These conventional systems overcome this issue at the cost of increased complexity or hardware in order to increase the dynamic range of the receiver. According to the present inventive concept, implementation of the pulsed waveform described in detail above mitigates these issues, thus providing a simpler and more cost effective solution. Also, the pulsed waveform of the inventive concept has the advantage of being less demanding of processor (CPU) time than frequency-modulated approaches. Also, the pulsed waveform of the inventive concept provides an unambiguous measurement of range and velocity on a sweep-by-sweep basis, thus reducing the latency of the system and enabling the classification of the obstacle by an analysis of the Doppler signature associated with each target.

According to the present inventive concept, the radar return signal is captured by a receiver antenna and down-converted by a homodyne mixer to baseband typically below 20 kHz before being digitalized by an A/D converter. Typically, the useful bandwidth of the baseband signal, which is set according to the Doppler/velocity of the relevant target, is less than 40 kHz for a 24 GHz radar system. The radar waveform includes 128 to 1024 points sampled with eight to sixteen bits resolution. The digital signal is processed by radar signal processing algorithms providing the localization, i.e., range, relative velocity, bearing, of potential relevant targets. An application layer, also referred to as a feature algorithm, can assess the list of reported obstacles and makes the final decision, e.g., warning, desired speed, etc.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

We claim:

1. A vehicle radar system for monitoring a blind spot of a vehicle, comprising:
   a radar transmitter mounted on the vehicle, the vehicle having a longitudinal axis running between a rear end of the vehicle and a front end of the vehicle and running along a line of travel of the vehicle; and
   a transmitting antenna array coupled to the radar transmitter, the radar transmitter and transmitting antenna array transmitting radiation in a pattern into a region adjacent to the vehicle, the pattern comprising a first radiation lobe, a second radiation lobe, and a null region between the first and second radiation lobes, the null region pointing in a direction perpendicular to the longitudinal axis of the vehicle.

2. The vehicle radar system of claim 1, wherein a bore sight of the antenna is directed away from the vehicle at an angle of 20 degrees from the null region toward the rear end of the vehicle.

3. The vehicle radar system of claim 1, wherein the transmitting antenna array comprises at least one planar antenna cell.

4. The vehicle radar system of claim 1, wherein the transmitting antenna array comprises:
   a first antenna cell and a second antenna cell for transmitting the radiation into the region; and
   a phase shifter between the first and second antenna cells, the phase shifter adjusting phase of at least one of the first and second antenna cells to steer the radiation.

5. The vehicle radar system of claim 4, wherein the phase shifter introduces 120 degrees of phase difference between the first and second antenna cells.

6. The vehicle radar system of claim 1, further comprising at least one receiving antenna array for receiving radiation return signals from objects in the region adjacent to the vehicle.

7. The vehicle radar system of claim 6, wherein the at least one receiving antenna array comprises first and second receiving antennas.

8. The vehicle radar system of claim 6, wherein the at least one receiving antenna array comprises at least one planar antenna cell.

9. The vehicle radar system of claim 6, further comprising a processor for processing the radiation return signals to determine at least one of speed and range of the objects in the region adjacent to the vehicle.

10. The vehicle radar system of claim 9, wherein the region adjacent to the vehicle in which the objects are detected includes a blind spot of the vehicle.

11. The vehicle radar system of claim 1, wherein the radar system is a pulsed Doppler radar system.

12. The vehicle radar system of claim 1, wherein the radar system operates at a radar frequency of 24 GHz.

* * * * *